(12) United States Patent
Jia et al.

(10) Patent No.: US 12,212,364 B2
(45) Date of Patent: Jan. 28, 2025

(54) MINIATURIZED MULTICHANNEL WAVELENGTH DIVISION MULTIPLEXING OPTICAL MODULE

(71) Applicant: II-VI Delaware, Inc., Wilmington, DE (US)

(72) Inventors: Xu Jia, Fuzhou (CN); Junjie Chen, Fuzhou (CN); Vincy Wu, Fuzhou (CN); Jin Chen, Fuzhou (CN); Lei Lin, Fuzhou (CN); Guanglong Yu, Fuzhou (CN)

(73) Assignee: II-VI DELAWARE, INC., Wilmington, DE (US)

( * ) Notice: Subject to any disclaimer, the term of this patent is extended or adjusted under 35 U.S.C. 154(b) by 106 days.

(21) Appl. No.: 18/149,528

(22) Filed: Jan. 3, 2023

(65) Prior Publication Data

US 2023/0231630 A1 Jul. 20, 2023

(30) Foreign Application Priority Data

Jan. 20, 2022 (CN) .......................... 202210066117.4

(51) Int. Cl.
*H04J 14/02* (2006.01)
*H04B 10/50* (2013.01)
*H04B 10/61* (2013.01)

(52) U.S. Cl.
CPC ....... *H04B 10/503* (2013.01); *H04B 10/6163* (2013.01); *H04J 14/0202* (2013.01)

(58) Field of Classification Search
CPC .............................. H04J 14/02; H04J 14/0202
See application file for complete search history.

(56) References Cited

U.S. PATENT DOCUMENTS

| | | | |
|---|---|---|---|
| 2003/0215240 A1* | 11/2003 | Grann | G02B 6/4215 398/85 |
| 2018/0128983 A1* | 5/2018 | Huang | H04J 14/0305 |
| 2020/0295862 A1* | 9/2020 | Iwasaki | H04J 14/0283 |

FOREIGN PATENT DOCUMENTS

CN 112114401 * 12/2020 ............. G02B 6/293

* cited by examiner

*Primary Examiner* — Nathan M Cors
(74) *Attorney, Agent, or Firm* — Blank Rome LLP

(57) ABSTRACT

An optical assembly is used for communicating laser light from a plurality of laser sources into channels for an optical network. The optical assembly comprises an optical substrate, an input optic, at least one Z-block, filters, at least one fiber collimator, and at least one delivery fiber. The input optic is disposed on the optical substrate and is configured to receive the laser light from the laser sources. The input optic is configured to collimate the laser light into a plurality of collimated laser beams. The at least one Z-block is disposed on the substrate and has an input surface and an output surface. The input surface has a plurality of filters disposed thereon, and the input surface is disposed at an angle of incidence relative to the collimated beams from the input optic. The output surface is disposed parallel to the input surface and can have at least one isolator. The at least one Z-block is configured to multiplex the collimated laser beams into at least one output signal having a plurality of the channels. At least one fiber collimator disposed on the substrate has an input and an output. The input is disposed in optical communication with the at least one Z-block and is configured to receive the output signal. The at least one delivery fiber is optically coupled to the output of the at least one fiber collimator and is configured to conduct the optical signal to a receptacle.

15 Claims, 11 Drawing Sheets

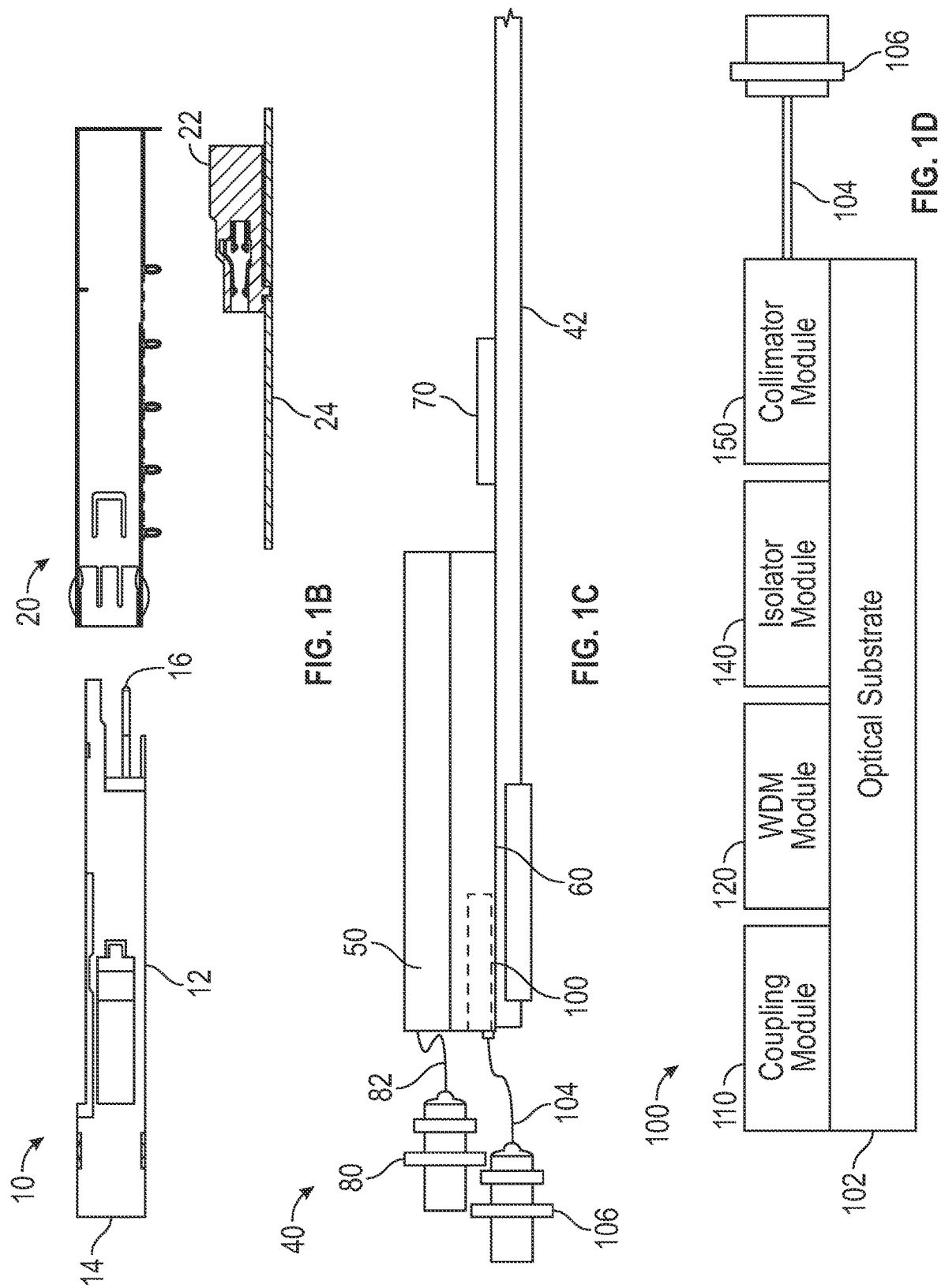

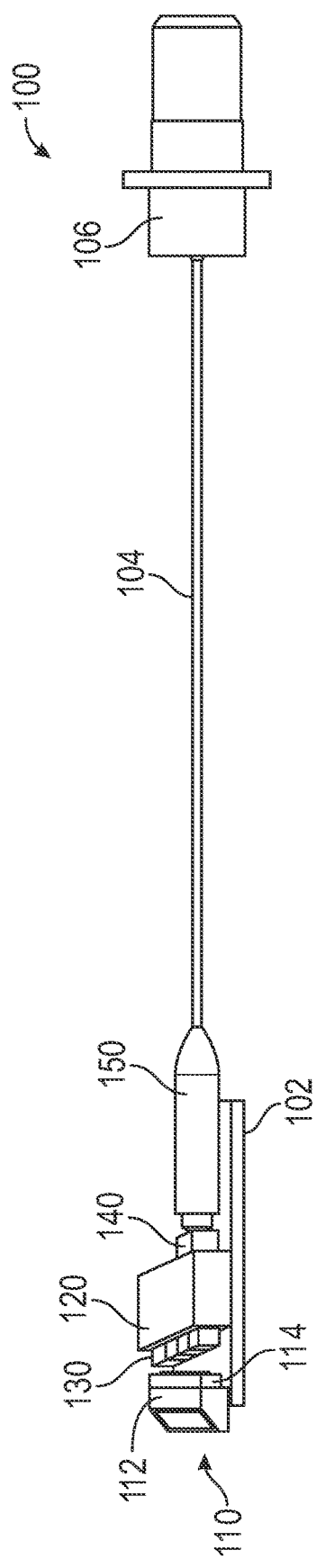
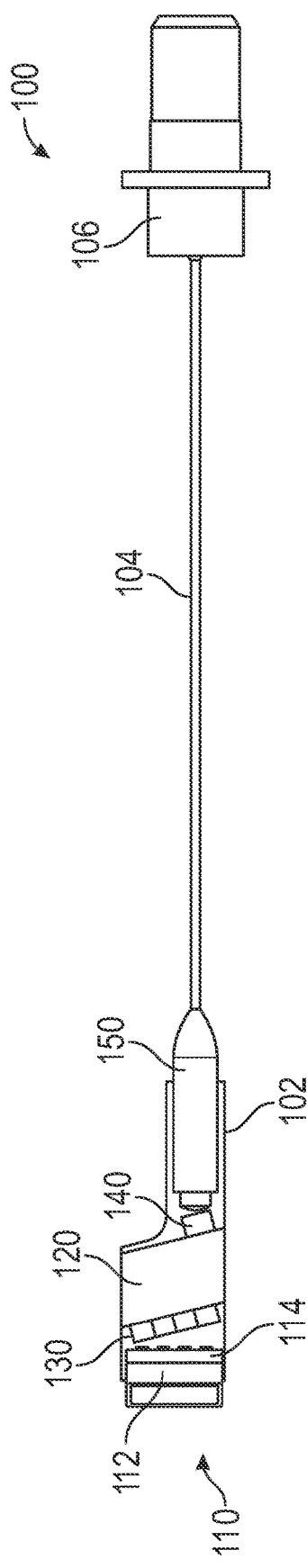
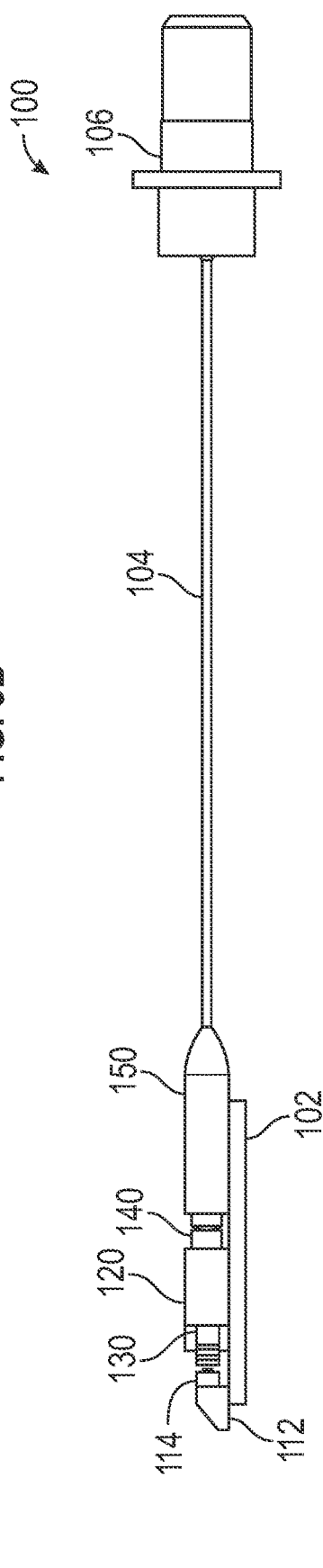
FIG. 3A
FIG. 3B
FIG. 3C

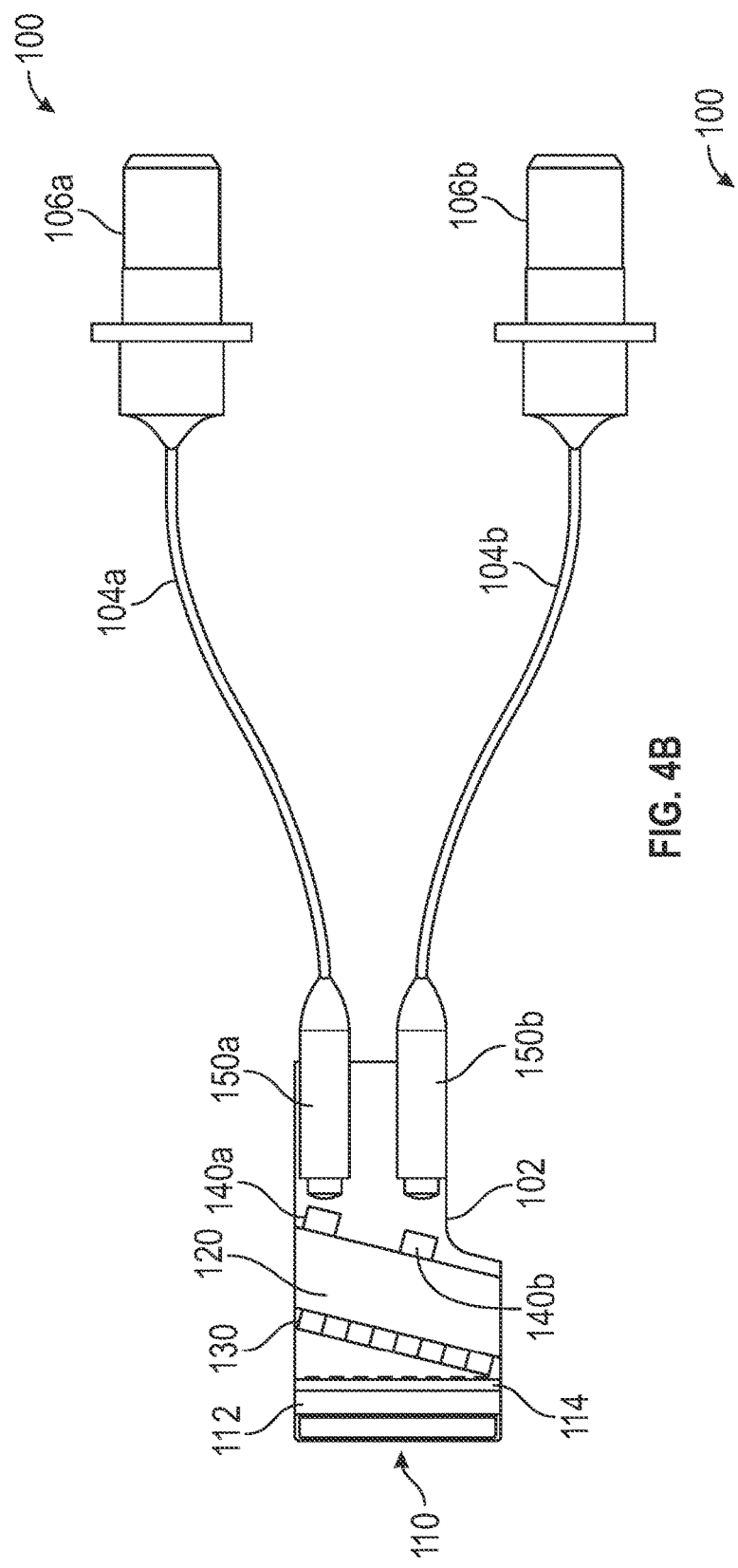
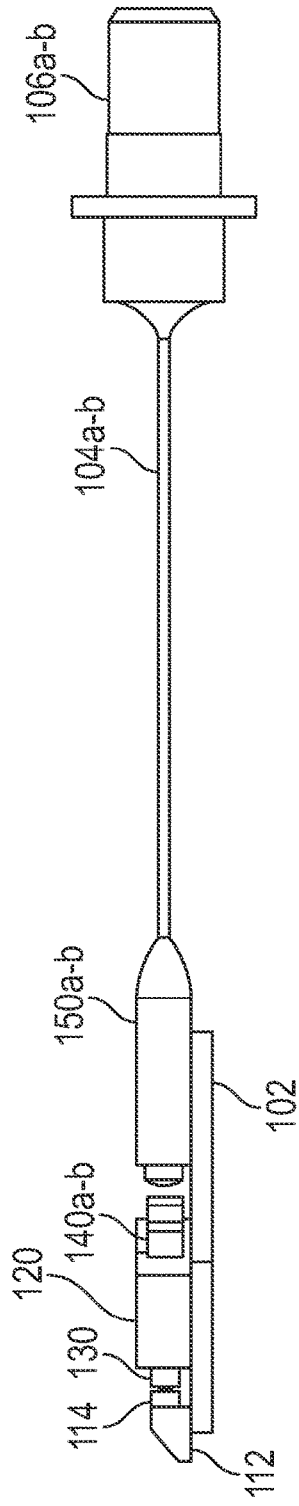
FIG. 4B
FIG. 4C

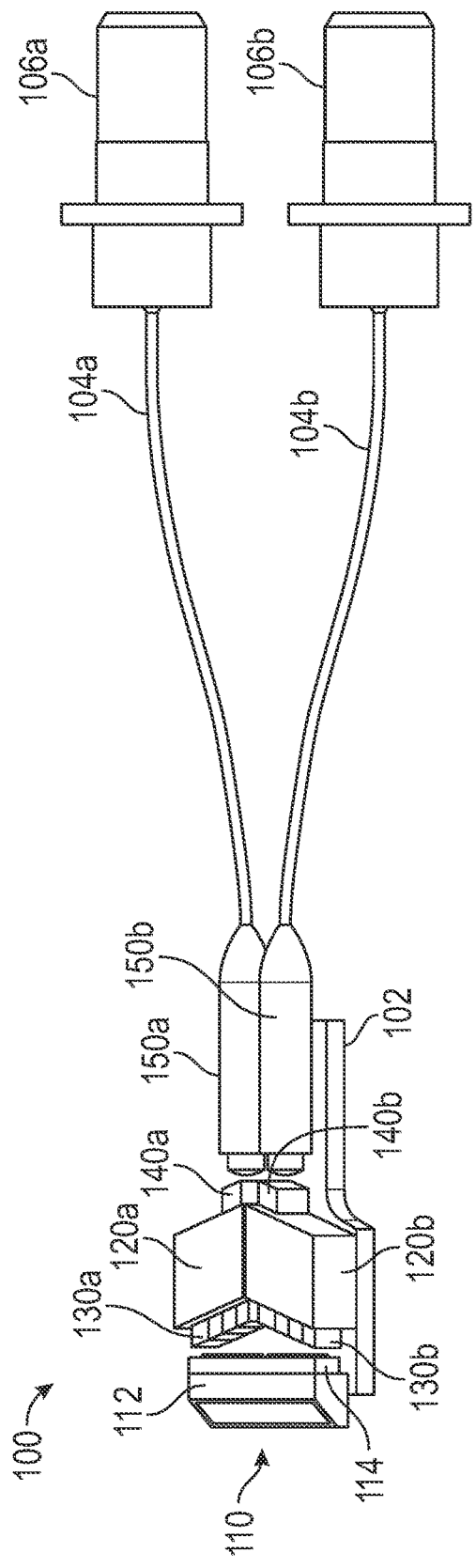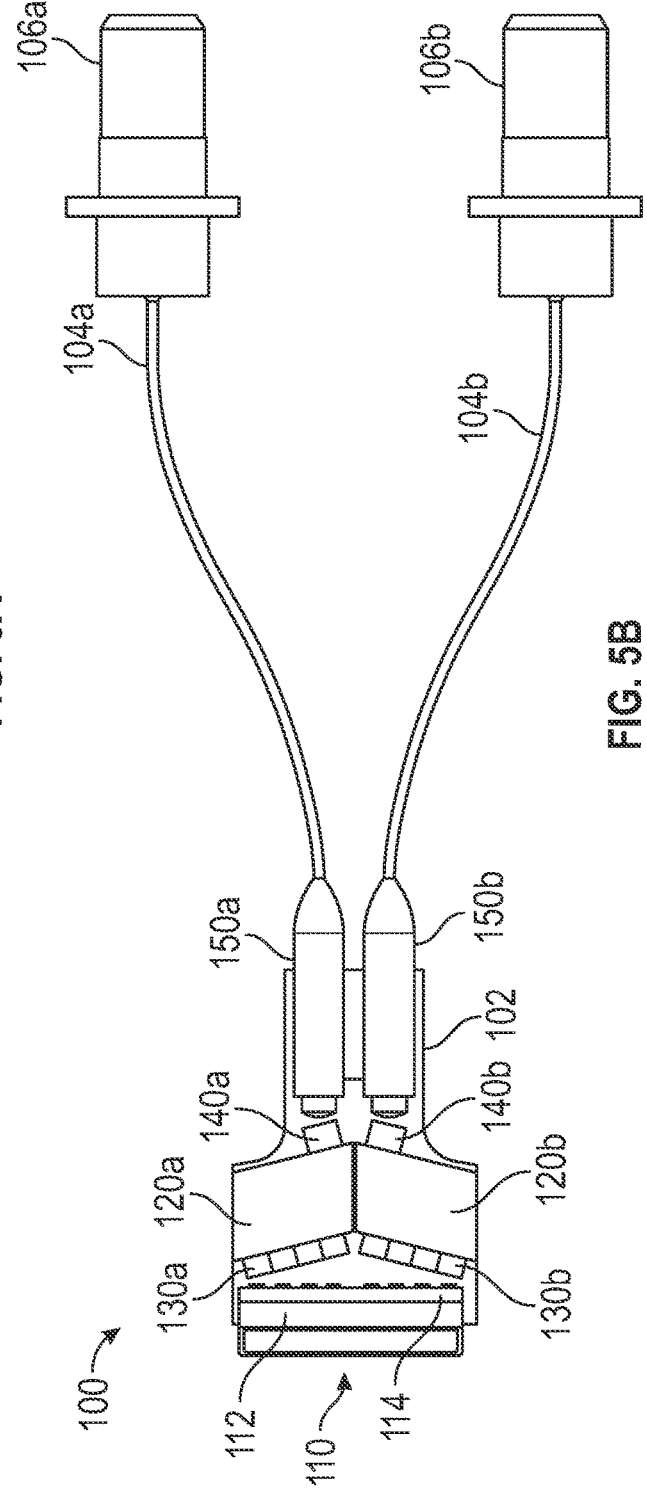

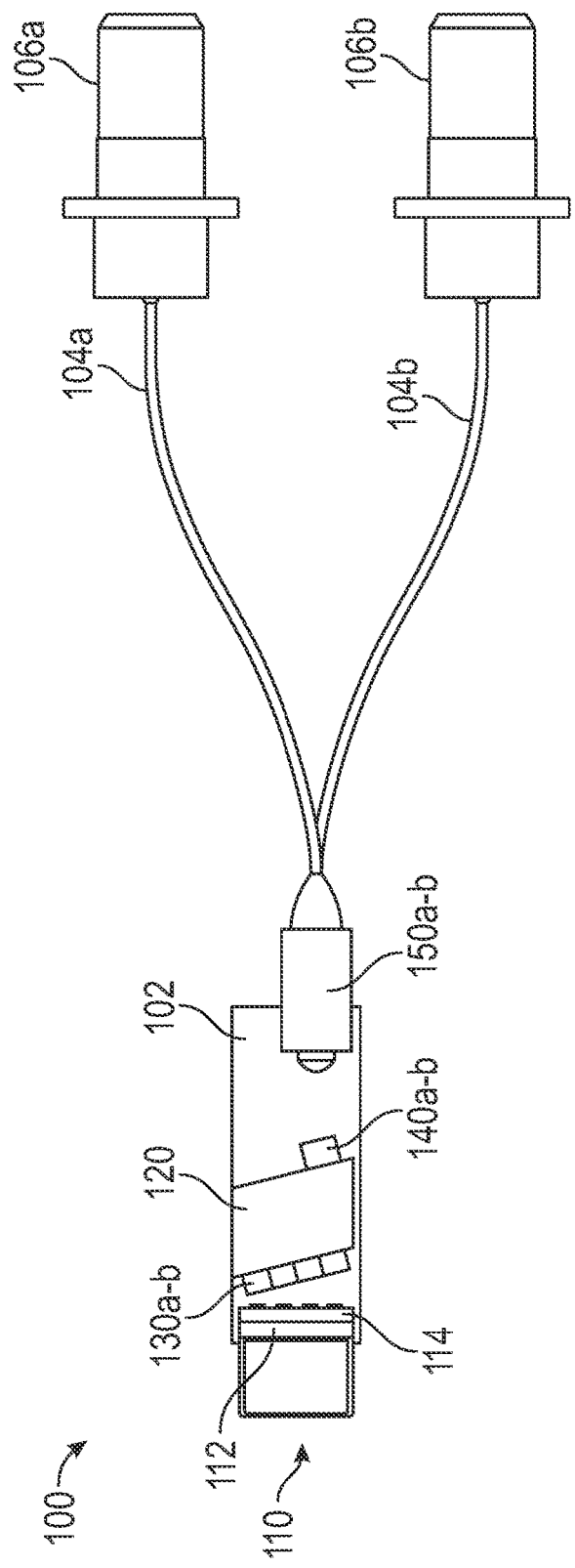
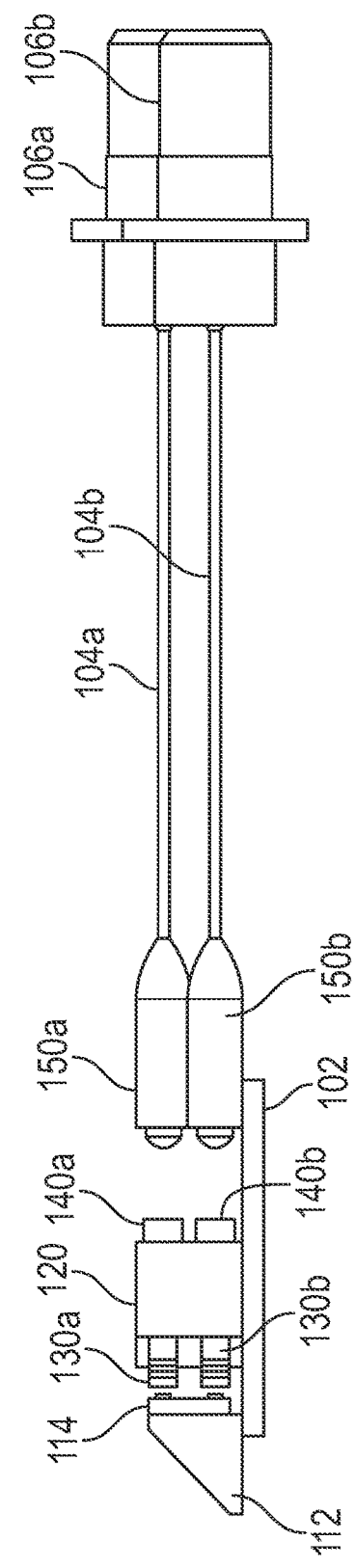
FIG. 6B
FIG. 6C

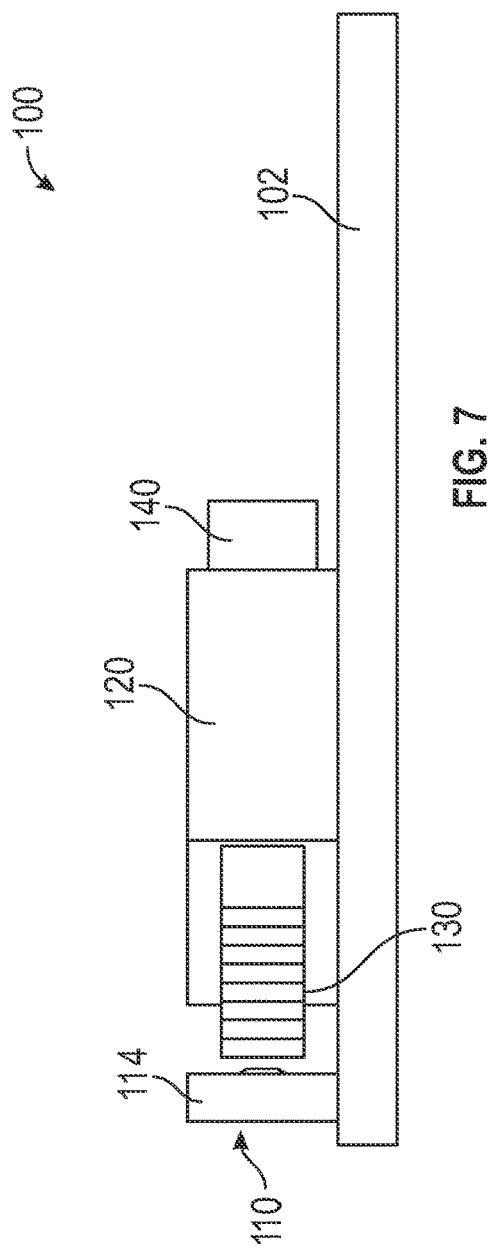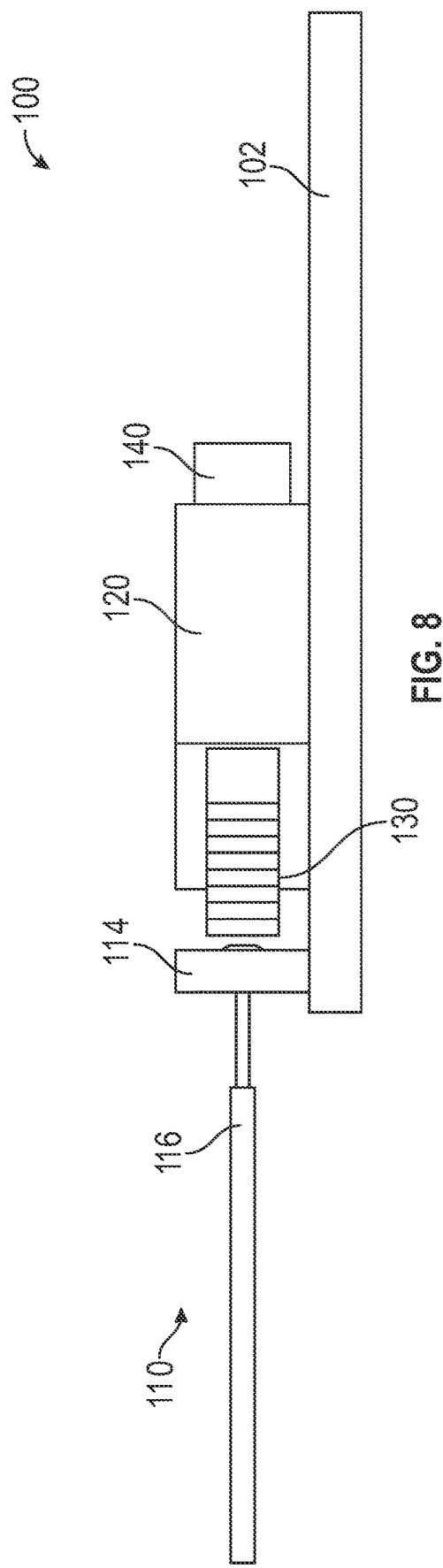

MINIATURIZED MULTICHANNEL WAVELENGTH DIVISION MULTIPLEXING OPTICAL MODULE

CROSS-REFERENCE TO RELATED APPLICATIONS

This patent application claims the benefit of Chinese Patent Application No. 202210066117.4, filed Jan. 20, 2022 which is incorporated herein by reference.

FIELD OF THE DISCLOSURE

The present disclosure is directed to a miniaturized, multi-channel wavelength division multiplexing (WDM) optical assembly providing high performance, easy assembly, low cost, and achievable automated mass production and the assembly method thereof.

BACKGROUND OF THE DISCLOSURE

Several existing techniques are used to achieve multi-channel wavelength division multiplexing (WDM). In a basic solution, discrete components are assembled separately to provide wavelength division multiplexing. Some typical discrete components include an optical fiber collimator, a WDM filter, a mirror, a coupling lens, a prism, or a beam splitter. Each component needs to be actively adjusted for alignment, which has low assembly efficiency, high costs, and is difficult to miniaturize.

In another solution, an 8-channel Z-block can be used as a MUX sub-component, and a laser array and a lens array can be used to input 8 collimators at the incident end. Then, an optical fiber collimator can be used to receive the outgoing WDM light after the 8-channel Z-block. This method has disadvantages, such as low assembly yield, poor performance, and poor return loss.

In yet another solution, an 8-channel arrayed waveguide grating (AWG) can be used as a MUX sub-component, and an optical fiber array can be directly coupled to the AWG input waveguide. Meanwhile, the output end of the AWG can be directly coupled to the output optical fiber. Although this assembly method is simpler and more efficient, there is still a large gap in the performance of AWG under the existing technology compared with the Z-block, which is mainly reflected in the key indicators such as high insertion loss, narrow bandwidth, large wavelength drift with temperature, poor crosstalk, and so on.

The subject matter of the present disclosure is directed to overcoming or at least reducing the effects of, one or more of the problems set forth above.

SUMMARY OF THE DISCLOSURE

An optical assembly is used for communicating laser light from a plurality of laser sources into channels for an optical network. The optical assembly comprises an optical substrate, an input optic, at least one Z-block, filters, at least one fiber collimator, and at least one delivery fiber. The input optic is disposed on the optical substrate and is configured to receive the laser light from the laser sources. The input optic is configured to collimate the laser light into a plurality of collimated laser beams. The at least one Z-block is disposed on the substrate and has an input surface and an output surface. The input surface has a plurality of filters disposed thereon, and the input surface is disposed at an angle of incidence relative to the collimated beams from the input optic. The output surface is disposed parallel to the input surface and can have at least one isolator.

The at least one Z-block is configured to multiplex the collimated laser beams into at least one output signal having a plurality of the channels. The at least one fiber collimator disposed on the substrate has an input and an output. The input is disposed in optical communication with the at least one Z-block and is configured to receive the output signal. The at least one delivery fiber is optically coupled to the output of the at least one fiber collimator and is configured to conduct the optical signal to a receptacle.

An optoelectronic module of the present disclosure comprises a duplex fiber connector, a plurality of optical receivers disposed in optical communication with the duplex fiber connector, and a plurality of optical transmitters disposed in optical communication with the duplex fiber connector. An optical assembly as disclosed above connects the plurality of optical transmitters to the duplex fiber connector.

The foregoing summary is not intended to summarize each potential embodiment or every aspect of the present disclosure.

BRIEF DESCRIPTION OF THE DRAWINGS

FIG. 1B illustrates an example of an optical module that is pluggable into a cage having a connector.

FIG. 1C illustrates a schematic side view of a transceiver assembly having an optical assembly according to the present disclosure.

FIG. 1D schematically illustrates an optical assembly according to the present disclosure.

FIGS. 3A-3C illustrate perspective, plan, and side views of a first embodiment of an optical assembly according to the present disclosure.

FIGS. 4A-4C illustrate perspective, plan, and side views of a second embodiment of an optical assembly according to the present disclosure.

FIGS. 5A-5C illustrate perspective, plan, and side views of a third embodiment of an optical assembly according to the present disclosure.

FIGS. 6A-6C illustrate perspective, plan, and side views of a fourth embodiment of an optical assembly according to the present disclosure.

FIG. 7 illustrates a side view of a portion of a fifth embodiment of an optical assembly according to the present disclosure.

FIG. 8 illustrates a side view of a portion of a sixth embodiment of an optical assembly according to the present disclosure.

DETAILED DESCRIPTION OF THE DISCLOSURE

The present disclosure discloses a miniaturized, multi-channel wavelength division multiplexing (MUX) optical assembly and the method of assembling the optical assembly.

Figure 1A:
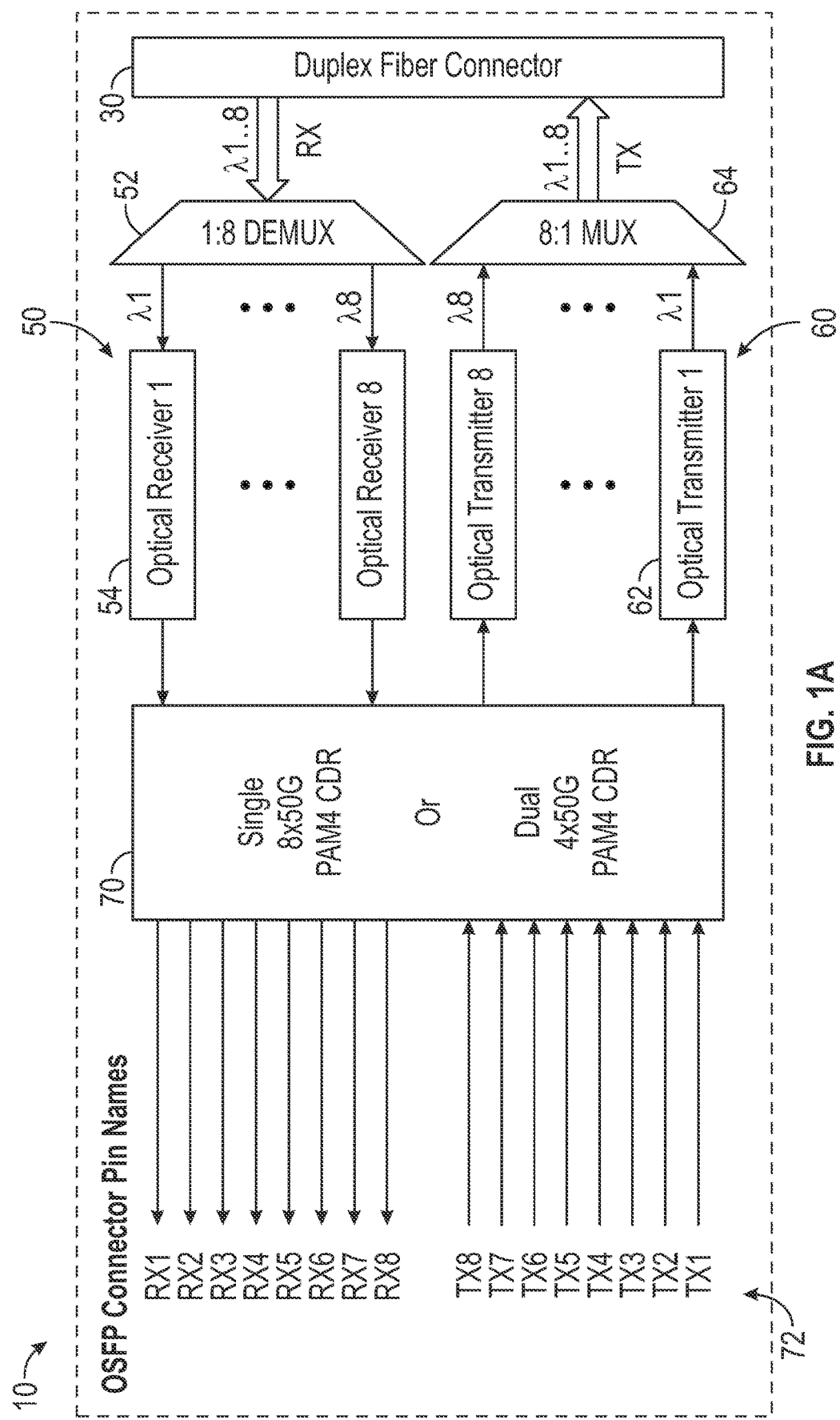
FIG. 1A illustrates a schematic diagram of an optical module according to the present disclosure.

FIG. 1A illustrates a schematic diagram of an optical module 10 according to the present disclosure. The module 10 can be a 400 G octal small form-factor pluggable (OSFP) optical module. The module 10 includes a duplex fiber connector 30 for connecting to optical fibers in a communication network. In an optical receiver subassembly 50, an input optical signal having multiple wavelengths (e.g., eight) is demultiplexed by a 1:8 demultiplexer 52 so that each wavelength passes to a respective optical receiver 54. Electrical signals of the optical responses from the receivers 54 pass to processing circuitry 70 (such as a single 8×50 G four-level pulse-amplitude modulation clock data recovery circuit (PAM4 CDR) or dual 4×50 G PAM4 CDR) to produce output signals from the connector pins 72 of the module 10.

In like manner, output electrical signals from connector pins 72 are processed by the processing circuitry 70 to generate control signals communicated to optical transmitters 62 of an optical transmitter subassembly 60. In turn, the optical transmitters 62 generate optical signals at appropriate wavelengths, which are multiplexed by an 8:1 multiplexer 64 so that an output optical signal can be passed to the optical communication network through the duplex fiber connector 30.

As shown in FIG. 1B, the optical module 10 of the present disclosure can be a pluggable device used with a cage 20 and a connector 22. The cage 20 is shown here unassembled to a base 24. The cage 20 is a press-fit cage used with a surface mount connector 22, which connects to the electronics of a host device (not shown). A variety of other hardware arrangements are available and can be used.

The optical module 10 has a housing 12, typically of standard form factor. One end 14 of the housing 12 includes ports for connection to optical fiber connectors, typically of standard dimensions and configurations. Internally, the optical module 10 includes a circuit board and components, such as lasers, photodetectors, digital signal processors, etc., housed together in the housing 12. The other end of the housing 12 has a paddle card 16 of the internal circuit board exposed, which can insert into the connector 22 and interface with the electrical connections for the host device.

The optical module 10 can perform transceiver functions. For transmission functions, the host device can provide outbound electronic data signals to the optical module 10 via the connector 22. The optical module 10 converts the electronic signals to outbound optical data signals for transmission across an optical network. For receiver functions, the optical module 10 can receive inbound optical data signals from the optical network and can convert them to inbound electrical data signals for the host device.

FIG. 1C illustrates a schematic side view of a transceiver 40 for use in the optical module 10 of the present disclosure. The transceiver 40 includes a circuit board 42, an optical receiver subassembly 50, an optical transmitter subassembly 60, processing circuitry 70, and one or more optical assemblies 100 of the present disclosure.

In general and as already noted, the transceiver 40 can be part of a pluggable module, such as shown in FIG. 1B used with a cage for a connector. The transceiver 40 is enclosed in the housing (12: FIG. 1B) along with other conventional components of a pluggable module. Particular form factors are available and can be used. Accordingly, the circuit board 42 and other components contained in the housing (12) are constrained by the dimensions of the form factor so all of the components can be used with a pluggable module as noted herein.

One or more fibers 82 connect optical signals received from one or more of the receptacle 80 to the optical receiver subassembly 50, which can include splitters, arrayed waveguide grating routers, multiplexers, filters, and the like. In use, the optical receiver subassembly 50 can perform various functions, including wavelength filtering, optical switching, and optical channel power control. The optical signals can be communicated to optoelectronic devices (e.g., input photodetectors) of the subassembly 50 that convert the optical signals to electrical signals. Transimpedance amplifiers (TIA) can then amplify the electrical signals, which are processed by a digital signal processor 70 and other conventional circuitry (not shown). The electronics of the module 10 are connected in electrical communication with a paddle card on the circuit board 40. As conventionally done, the paddle card can insert into a connector and can interface with the electrical connections for a host device.

One or more fibers 104 convey transmitted optical signals from the optical transmitter subassembly 60 to the one or more other receptacles 106. The transmitter subassembly 60 includes optoelectronic devices (e.g., laser emitters), lenses, and combining optics for transmission. According to the present disclosure, an optical assembly 100 is used with the transceiver 40 as part of the transmitter side of the transmitter subassembly 60.

As schematically shown in FIG. 1D, the optical assembly 100 of the present disclosure includes a coupling module or input optic 110, a wavelength division multiplexing module 120, an isolator module 140, and a collimator module 150. Each of these is installed on an optical substrate 102. The coupling module or input optic 110 can interface with components of a transmitter subassembly, such as laser sources. Meanwhile, fibers 104 and receptacles 106 connect from the collimator module 150.

As generally shown in FIGS. 2 to 10, the coupling module or input optic 110 of the present disclosure can include a lens array 114, a combination of a lens array 114 and a prism 112, or a combination of a lens array 114 and a fiber array 116 for collimating the light emitted by laser sources. In general, the WDM module 120 includes one or more WDM sub-modules with a Z-block 122. The isolator module 140 is a kind of free-space optical isolator, which can provide the functions of forward transmission and reverse isolation to prevent the influence of reflected light on the performance of the laser sources.

As generally shown in FIGS. 3A to 10, the collimator 150 includes one or more single-fiber collimators or fiber array collimators for receiving and coupling WDM light beams into fiber. In general, the optical substrate 102 can be processed into various shapes according to requirements, and a series of high-precision position alignment lines can be produced on the substrate 102 according to design by a laser marking or a photoengraving mask method. The coupling module 110, the WDM module 120 (filters 130, Z-block 122, films 126, 128), the isolator 140, and the collimators 150 can be assembled on the optical substrate 102 in a specified position. Optical signals of multiple different center wavelengths at the input end can be collimated, and the optical signals are efficiently coupled into the optical fiber after WDM.

The optical assembly 100 of the present disclosure is an integrated passive optical component, which can be widely used in an optical transmitting end of an optical transceiver 50. A laser signal at the transmitting end is received and collimated by the coupling module 110, wavelength division multiplexed by the WDM module 140, passed through the isolator module 140, and finally through collimator module 150 coupling into the optical fiber 104 for output from an optical fiber interface 106. The disclosed optical assembly 100 has the advantages of miniaturization, integration, low cost, easy mass production, high performance, and high reliability, and the disclosed assembly 100 can fully meet optical communication and laser radar industry standards.

Figure 2:
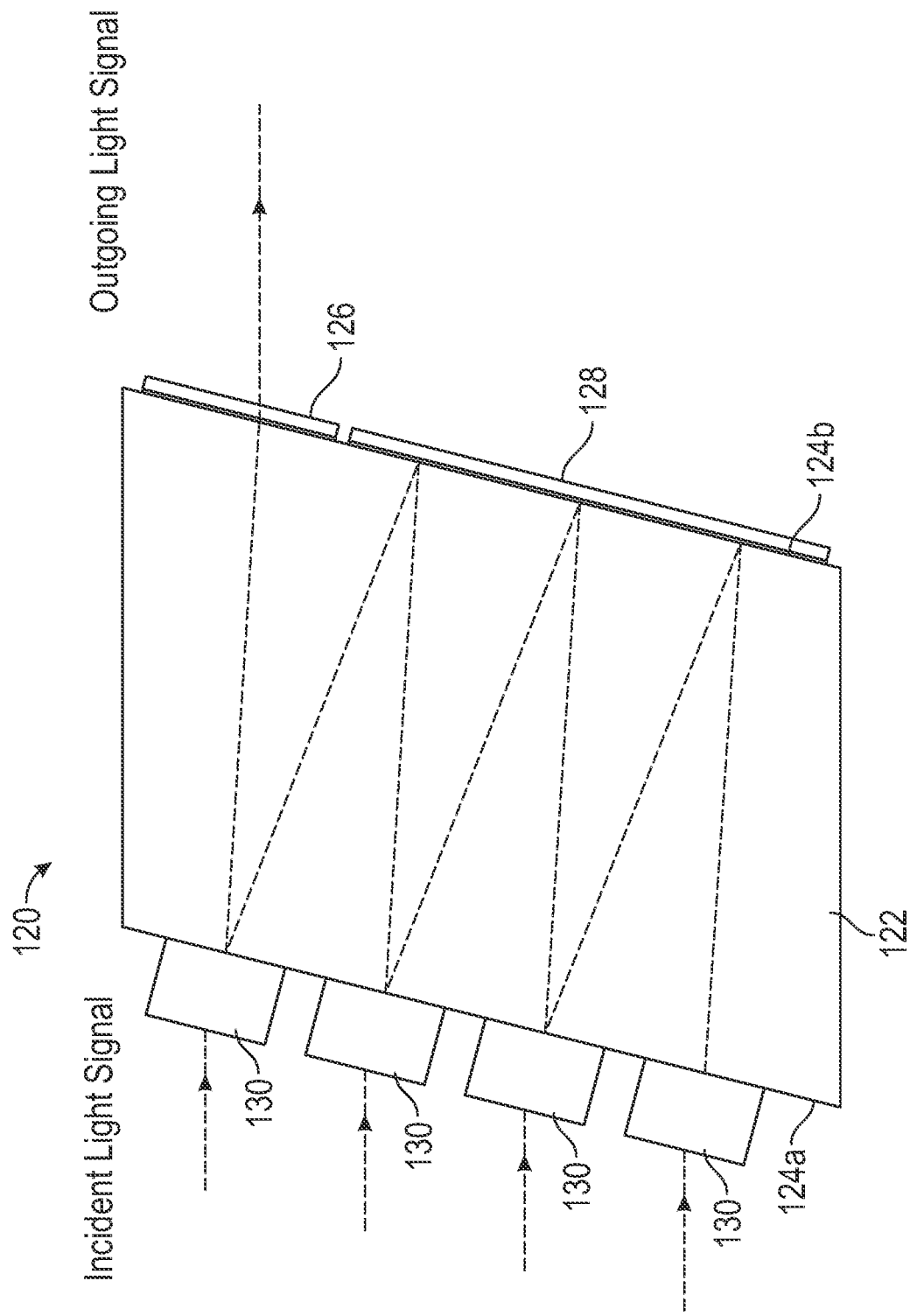
FIG. 2 illustrates a plan view of a wavelength division multiplexing (MUX) sub-module for an optical assembly according to the present disclosure.

Turning to FIG. 2, the WDM module 120 includes one or more WDM sub-modules with a Z-block 122 shown in a plan view. Briefly, the module 120 includes a parallel quadrilateral glass plate or block 122 polished on both front and back sides 124a-b. WDM filters 130 with different central wavelengths are attached to one side 124a of the polished glass block 122, and the other side 124b of the glass block 122 is coated with an anti-reflection (AR) film 126 and with a high-reflection (HR) film 128, which enables the collimation of N (N≥2) different WDM wavelengths.

A. First Embodiment

FIGS. 3A-3C illustrate perspective, plan, and side views of a first embodiment of an optical assembly 100 according to the present disclosure. This embodiment is suited for a CWDM4 WDM optical transmitting assembly, which can be used in a 400 G optical module.

The optical assembly 100 includes an optical substrate 102 on which an input optic 110 (a rectangular prism 112 and a lens array 114), a 4-channel Z-block module 120, an optical isolator 140, and an optical fiber collimator 150 are mounted. An optical fiber 104 connects the optical fiber collimator 150 to a receptacle 106, such as a Lucent connector (LC).

The optical assembly 100 is used with four laser chips (not shown) of an optical transmitting assembly (not shown). The four laser chips have a pitch and emit four laser signals. For example, the laser chips can have a pitch of 0.75+/−0.001 mm and can emit four laser signals with an interval of 20 nm between them. The central wavelengths can be 1271 nm, 1291 nm, 1311 nm, and 1331 nm, respectively. The four laser signals pass through a bottom surface of the prism 112, transmit upward, and then fully reflect by the bevel of the prism 112. After passing through the lens array 114 with an appropriate pitch (e.g., 0.75+/−0.001 mm), the laser signals become collimated beams, in which the four collimated optical signals are parallel to each other. The interval between adjacent beams is related to the pitch (e.g., 0.75 mm). The four collimated optical signals pass into the filters 130 of the 4-channel Z-block module 120 at an incident angle of 13.5 degrees and enter into the Z-block module 120.

As shown here and in FIG. 2, four filters 130 with appropriate central wavelengths (e.g., 1271 nm, 1291 nm, 1311 nm, and 1331 nm) are sequentially attached to the entry surface of the 4-channel Z-block module 120, and the filters 130 have an appropriate pitch distance between them (e.g., 0.75+/−0.02 mm). The four collimated optical signals are multiplexed into one WDM optical signal that has the four wavelengths after passing through the Z-block module 120. Then, the WDM optical signal passes through the optical isolator 140 and enters the optical fiber collimator 150. Finally, after passing the optical fiber collimator 150, the WDM optical signal is coupled into the outgoing optical fiber 104 having the LC receptacle 106.

B. Embodiment 2

Figure 4A:
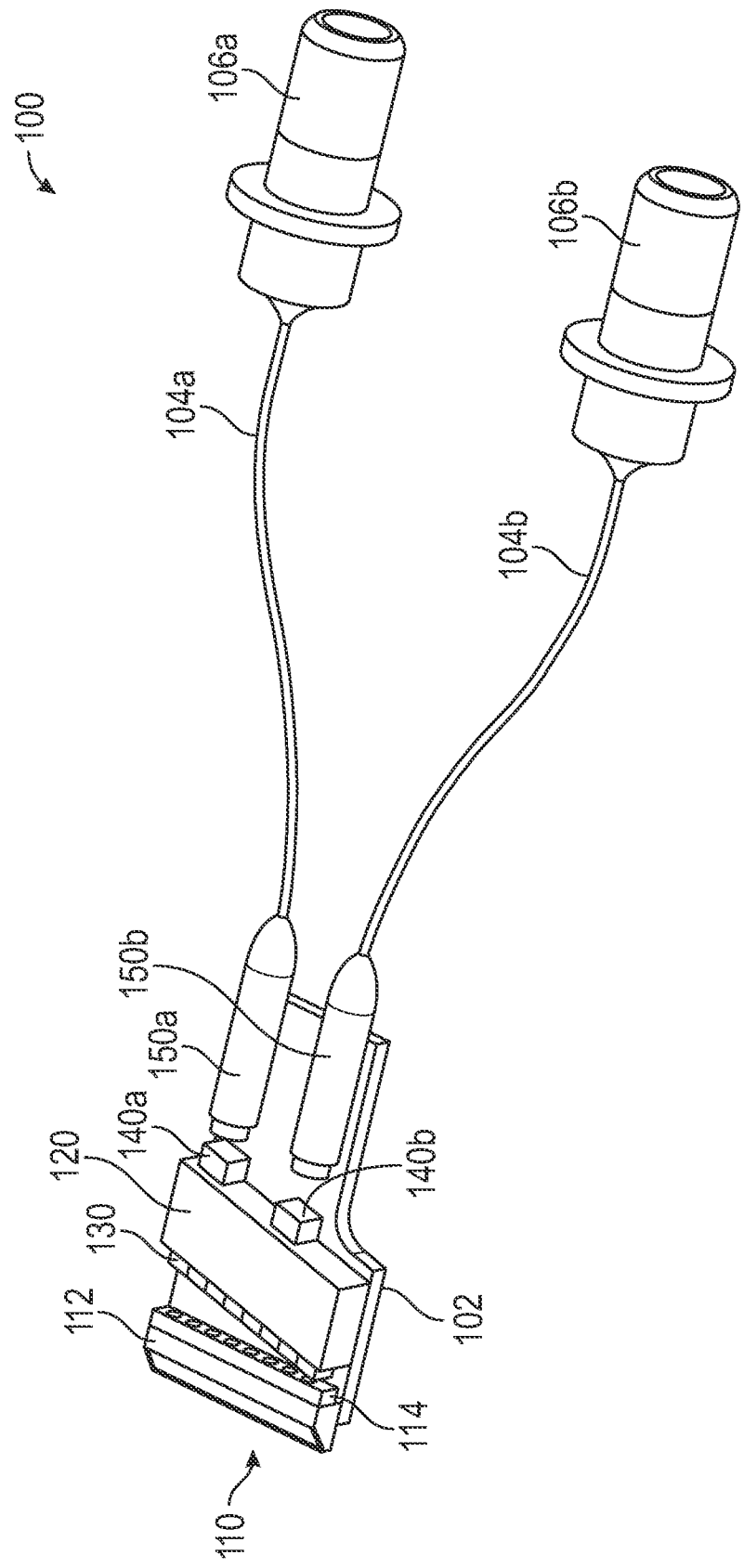

FIGS. 4A-4C illustrate perspective, plan, and side views of a second embodiment of an optical assembly 100 according to the present disclosure. This embodiment is suited for a CWDM8 WDM optical transmitting assembly covering O-band and E-band, which can be widely used in a 400 G OSFP optical module.

Eight laser chips (not shown) with a pitch (e.g., 0.75+/−0.001 mm) of the transmitting assembly emit eight laser signals with an interval of 20 nm between them. The central wavelengths can be 1271 nm, 1291 nm . . . 1411 nm, respectively. The eight laser signals pass through a bottom surface of the prism 112 of an input optic 110, transmit upward, and then fully reflect by the bevel of the prism 112. After passing through a lens array 114 of the input optic 110 having a corresponding pitch (e.g., 0.75+/−0.001 mm), the signals become collimated beams, in which eight collimated optical signals are parallel to each other. The interval between adjacent beams can be 0.75 mm.

The eight collimated optical signals pass into filters 130 of an 8-channel Z-block 120 at the incident angle of 13.5 degrees and enter into the Z-block 120. The eight filters 130 with central wavelengths (e.g., $\lambda a1$~$\lambda a4$ and $\lambda b1$~$\lambda b4$) are sequentially attached to the entry surface of the 8-channel Z-block 120 with a corresponding pitch distance (e.g., 0.75+/−0.02 mm). The pitch or the size/tolerances of the filter may not need extremely high accuracy. After passing through the Z-block module 120, the eight collimated optical signals are multiplexed into two WDM optical signals having two groups of wavelengths: $\lambda a$ ($\lambda a1$~$\lambda a4$) and $\lambda b$ ($\lambda b1$~$\lambda b4$). (Here, the central wavelengths of $\lambda a1$~$\lambda a4$ can be 1271 nm, 1291 nm, 1311 nm, 1331 nm respectively, and the central wavelengths of $\lambda b1$~$\lambda b4$ can be 1351 nm, 1371 nm, 1391 nm, and 1411 nm, respectively.) The distance between the two WDM optical signals is at a defined distance (e.g., 3 mm).

Then, the two WDM optical signals pass through two optical isolators 140a-b and enter two optical fiber collimators 150a-b. These collimators 150a-b can have an interval and tolerance of 3000+/−20 µm. The collimator's interval and tolerance may not need extremely high accuracy. Finally, after passing through two optical fiber collimators 150a-b, WDM optical signals are coupled into outgoing optical fibers 104a-b having the receptacle 106a-b.

C. Embodiment 3

Figure 5C:

FIGS. 5A-5C illustrate perspective, plan, and side views of a third embodiment of an optical assembly 100 according to the present disclosure. This embodiment is suited for a CWDM8 WDM optical transmitting assembly covering O-band and E-band, which can be widely used in a 400 G OSFP optical module.

Two groups (four in each group) of laser chips (not shown) emit eight laser signals with an interval of 20 nm between them. Central wavelengths can be 1271 nm, 1291 nm . . . 1411 nm. Therefore, one group can contain four wavelengths: 1271 nm, 1291 nm, 1311 nm, and 1331 nm, while the other group can contain the other four wavelengths: 1351 nm, 1371 nm, 1391 nm, and 1411 nm. The pitch between the adjacent laser chips in each group can be 0.75 mm, and the distance between the adjacent laser chips in the two groups can be 1.1 mm.

The eight laser signals pass through the bottom surface of the prism 112 of the input optic 110, transmit upward, and then fully reflect by the bevel of the prism 112. After passing through two groups of lens arrays 114 of the input optic 110 with appropriate spacing (e.g., 1.1 mm) and pitch (e.g., 0.75+/−0.001 mm) in each group, the signals become collimated beams. The collimated light of the two groups of wavelengths is parallel to each other.

The two groups of eight collimated optical signals pass into filters 130 of two 4-channel Z-blocks of the modules 120a-b at the incident angles of 13.5 degrees and enter into Z-blocks of modules 120a-b. Eight filters 130a-b with central wavelengths of λa1~λa4 and λb1~λb4 are sequentially attached to the entry surfaces of the two 4-channel Z-blocks of the modules 120a-b. The pitch between adjacent filters 130a-b in each Z-block 120a-b can be 0.75 mm, and the distance between adjacent filters 130a-b on the two Z-block modules 120a-b can be 1.1 mm.

After passing through the Z-block modules 120a-b, the eight collimated optical signals are multiplexed into two WDM optical signals with two groups of wavelengths: λa (λa1~λa4) and λb (λb1~λb4). (Here, for example, the central wavelengths of λa1~λa4 can be 1271 nm, 1291 nm, 1311 nm, 1331 nm respectively, and the central wavelengths of λb1~λb4 can be 1351 nm, 1371 nm, 1391 nm, and 1411 nm respectively.) The distance between two WDM optical signals can be 1.97 mm.

Then, the two WDM optical signals pass through two optical isolators 140a-b and enter two optical fiber collimators 150a-b, which can have an interval and tolerance of 1970+/−20 μm. Finally, after passing two optical fiber collimators, WDM optical signals are coupled into outgoing optical fibers 104a-b having the receptacles 106a-b.

D. Embodiment 4

Figure 6A:
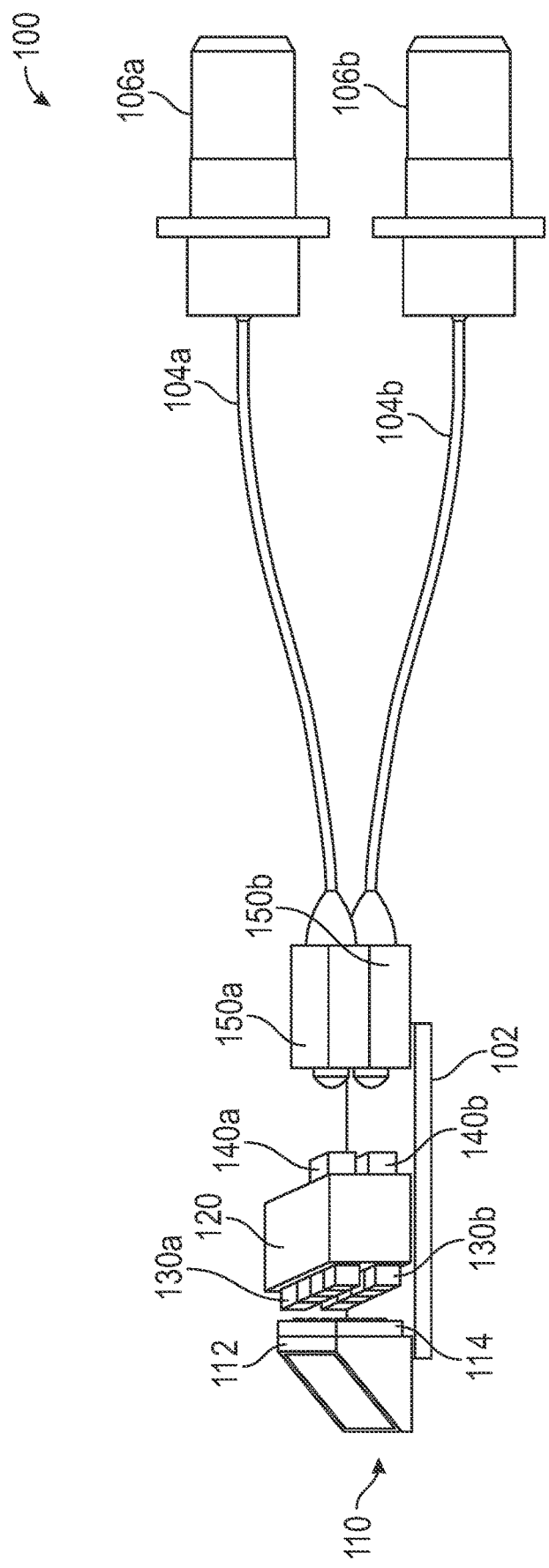

FIGS. 6A-6C illustrate perspective, plan, and side views of a fourth embodiment of an optical assembly 100 according to the present disclosure. This embodiment is suited for a CWDM8 WDM optical transmitting assembly covering O-band and E-band, which can be widely used in a 400 G OSFP optical module.

Two groups (four in each group) of laser chips (not shown) emit 8 laser signals with an interval of 20 nm, which can have central wavelengths are 1271 nm, 1291 nm . . . 1411 nm. One group can contain four wavelengths: 1271 nm, 1291 nm, 1311 nm, and 1331 nm, and the other group can contain other four wavelengths: 1351 nm, 1371 nm, 1391 nm, and 1411 nm. The pitch between adjacent laser chips in each group is 0.75 mm, and the spacing between the two groups is 1.4 mm. Eight laser signals pass through the bottom surface of the prism 112, transmit upward, and then are fully reflected by the bevel of the prism 112.

After passing through two groups of lens arrays 114 of the input optic 110 with the spacing of 1.4 mm in the direction perpendicular to the plane of the optical substrate 102 (defined as the Y direction) and the pitch of 0.75+/−0.001 mm in each group, they become collimated beams. The collimated beams of the two groups of wavelengths are parallel to each other and separated by the spacing of 1.4 mm in the Y direction. Two groups of eight collimated optical signals enter into filters 130 of the 2×4-channel Z-block module 120 at the incident angle of 13.5 degrees and enter into the Z-block of the module 120. The entry surface of the 2×4 Z-block of the module 120 is divided into upper and lower groups. One group is affixed with four filters 130a with central wavelengths of 1271 nm, 1291 nm, 1311 nm, and 1331 nm, and the other group is affixed with four filters 130b with central wavelengths of 1351 nm, 1371 nm, 1391 nm, and 1411 nm. The pitch between adjacent filters 130a-b in each row of Z-block 120 is 0.75 mm, and the spacing of filters 130a-b of two groups in the Y direction is 1.4 mm.

After passing through the Z-block module 120, eight collimated optical signals are multiplexed into two WDM optical signals with two groups of wavelengths: λa (λa1~λa4) and λb (λb1~λb4). (Here, the central wavelengths of λa1~λa4 can be 1271 nm, 1291 nm, 1311 nm, and 1331 nm respectively, and central wavelengths of λb1~λb4 can be 1351 nm, 1371 nm, 1391 nm, and 1411 nm, respectively.) The distance in the Y direction between two WDM optical signals can be 1.4 mm.

Then, two WDM optical signals pass through two optical isolators 140a-b and enter two optical fiber collimators 150a-b with an interval and tolerance of 1400+/−0.5 Finally, after passing two optical fiber collimators 150a-b, WDM optical signals are coupled into outgoing optical fibers 104ab having the receptacles 106a-b.

E. Embodiment 5

FIG. 7 illustrates a side view of a portion of a fifth embodiment of an optical assembly 100 according to the present disclosure. This embodiment represents a modified structure of other embodiments disclosed herein, such as the second embodiment from FIG. 4A-4C. Here, the coupling module or input optic 110 only has a lens array 114. In this structure, the lasers from the laser chips (not shown) are directly collimated by the lens array 114, pass through the filters 130, enter the Z-block module 120, pass into the isolator 140 after the MUX, and then pass on to the collimator (150) and fiber (104).

This structure eliminates the rectangular prism (112) of FIGS. 4A-4C, and this structure has the advantages of simple structure and low assembly difficulty, which helps to improve the yield and reduce the cost. In this case, the focal plane of the lens array 114 can be coincident with the position of the laser chip by strictly controlling the distance between the laser chip and the lens array 114. The specific implementation method of this example is the same as the previous implementation example and will not be described here.

F. Embodiment 6

FIG. 8 illustrates a side view of a portion of a fifth embodiment of an optical assembly 100 according to the present disclosure. This embodiment represents a modified structure of other embodiments disclosed herein, such as the second embodiment from FIG. 4A-4C. Here, the coupling module or input optic 110 includes a combination of a lens array 114 and a fiber array 116. In this structure, the lasers emitted from laser chips (not shown) are first coupled into the fiber array 116, pass through the lens array 114 and filters 130, enter the Z-block module 120, then pass into the isolator 140 after MUX, and then pass on to the collimator (150) and optical fiber (104).

There will be no limit to the types of laser chips that can be used with this structure, and installation of this structure in a module will be more flexible. In this case, the distance between the optical fiber array and the lens array 114 can be strictly controlled to ensure that the focal plane position of the lens array 114 coincides with the exiting position of the optical fiber array 116. The specific implementation method of this example is the same as the previous implementation example and will not be described here.

G. Embodiment 7

Figure 9:
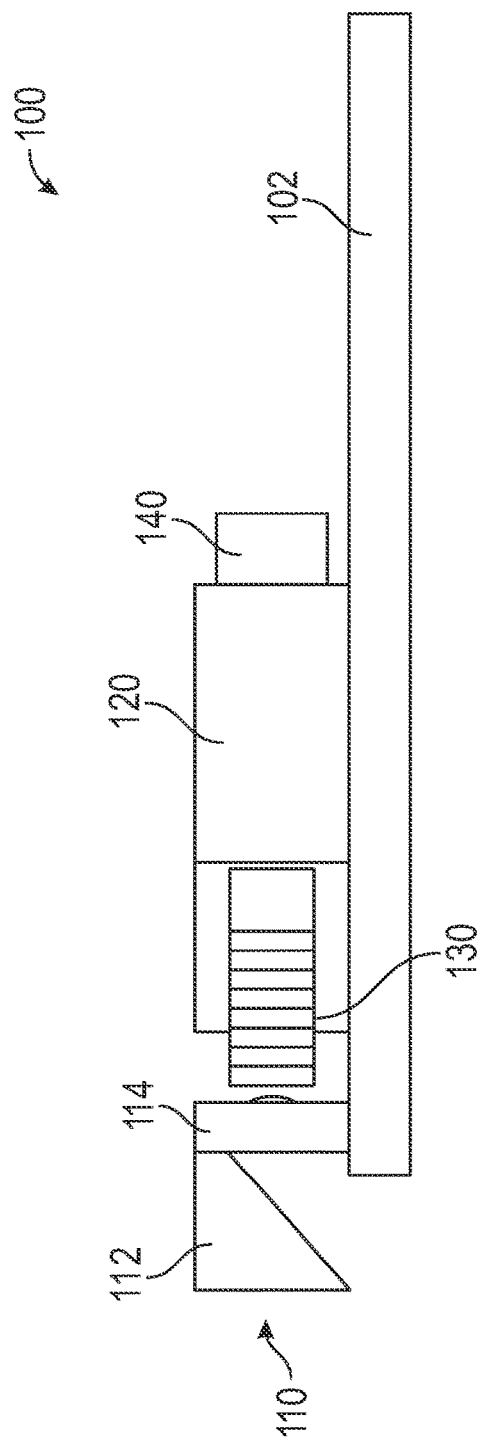
FIG. 9 illustrates a side view of a portion of a seventh embodiment of an optical assembly according to the present disclosure.

FIG. 9 illustrates a side view of a portion of a fifth embodiment of an optical assembly 100 according to the present disclosure. This embodiment represents a modified structure of other embodiments disclosed herein, such as the second embodiment from FIG. 4A-4C. Here, the prism 112 of the input optic 110 is reflected by an inclined plane, so a longer focal length lens array 114 of the input optic 110 can be chosen. Therefore, laser chips (not shown) with a larger waist diameter can be selected to reduce the cost. In this case, the focal plane of the lens array 114 can be coincident with the position of the laser chip by strictly controlling the distance between the laser chip and the lens array 114. The specific implementation method of this example is the same as the previous implementation example and will not be described here.

H. Embodiment 8

Figure 10:
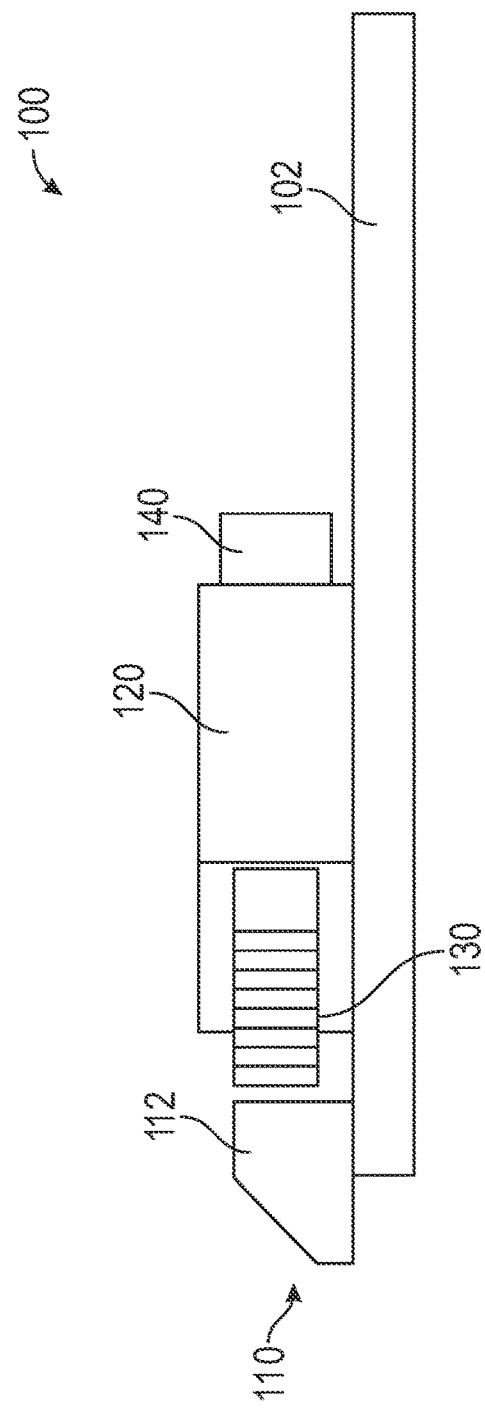
FIG. 10 illustrates a side view of a portion of an eighth embodiment of an optical assembly according to the present disclosure.

FIG. 10 illustrates a side view of a portion of a fifth embodiment of an optical assembly 100 according to the present disclosure. This embodiment represents a modified structure of other embodiments disclosed herein, such as the second embodiment from FIG. 4A-4C. Here, the coupling module or input optic 110 has a rectangular prism 112. In this structure, the laser output end of the laser chip (not shown) is connected with the lens array 114 to ensure that the emitted light is collimated. It is directly reflected by the rectangular prism 112, passed through the filters 130, passed into the Z-block module 120 where they are multiplexed, passed into the isolator 140, and then passed into the collimator (150) and optical fiber (104).

This structure eliminates the lens array 114 and is used to satisfy the output of laser chips with lens array 114. It has the advantages of simple structure and low assembly difficulty, which help to improve the yield and reduce the cost. The specific implementation method of this example is the same as the previous implementation example and will not be described here.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed is:

1. An optical assembly for communicating laser light from a plurality of laser sources into channels for an optical network, the laser sources arranged at a first pitch, the optical assembly comprising:
    an optical substrate;
    an input optic disposed on the optical substrate and configured to receive the laser light from the laser sources, the input optic being configured to collimate the laser light into a plurality of collimated laser beams;
    at least one Z-block disposed on the substrate and having an input surface and an output surface, the input surface having a plurality of filters disposed thereon, the input surface being disposed at an angle of incidence relative to the collimated beams from the input optic, the output surface disposed parallel to the input surface, the at least one Z-block being configured to multiplex the collimated laser beams into at least one output signal having a plurality of the channels, wherein the plurality of filters are arranged into upper and lower groups, the filters each having a pitch within the respective upper and lower groups, and the upper and lower groups having a spacing between the groups orthogonal to the optical substrate, the spacing being different than the pitch;
    at least two fiber collimators in optical communication, respectively, with each of the upper and lower groups, and disposed on the substrate and having an input and an output, the input disposed in optical communication with the at least one Z-block and, respectively, with the upper and lower groups, and being configured to receive the at least one output signal;
    at least two optical isolators on a second portion of the output surface and, respectively, in optical communication with the at least two fiber collimators; and
    at least one delivery fiber optically coupled to the output of the at least one fiber collimator and being configured to conduct the at least one optical signal to a receptacle.

2. The optical assembly of claim 1, wherein the input optic comprises a prism having an input surface, a reflecting surface, and an output surface, the input surface being configured to receive the laser light from the laser sources, the reflecting surface being configured to reflect the laser light from the input surface to the output surface.

3. The optical assembly of claim 2, wherein the input optic further comprises a lens array disposed adjacent the output surface, the lens array being configured to collimate the laser light into the plurality of collimated laser beams.

4. The optical assembly of claim 1, wherein the input optic comprises a lens array being configured to collimate the laser light into the plurality of collimated laser beams.

5. The optical assembly of claim 1, wherein the input optic comprises:
    a fiber array disposed in communication with the laser sources; and
    a lens array disposed on the optical substrate in optical communication with the fiber array, the lens array being configured to collimate the laser light into the plurality of collimated laser beams.

6. The optical assembly of claim 1, wherein the at least one Z-block comprises a high-reflective coating disposed on a first portion of the output surface and comprises an anti-reflecting coating disposed on a second portion of the output surface, the second portion in optical communication with the at least one fiber collimator.

7. The optical assembly of claim 1, wherein the at least two optical isolators are separated by the spacing.

8. The optical assembly of claim 1, wherein the optical assembly comprises only one of the at least one Z-block disposed on the substrate.

9. The optical assembly of claim 8, wherein the only Z-block comprises eight of the plurality of filters disposed on the input surface, the signal Z-block being configured to multiplex the collimated laser beams into two of the at least one output signal, each of the two output signals having four of the channels.

10. The optical assembly of claim 9, wherein the upper and lower groups comprise are in two rows along the input surface.

11. The optical assembly of claim 9, comprising two of the at least one delivery fiber.

12. The optical assembly of claim 1, wherein the module comprises two of the at least one delivery fiber.

13. An optoelectronic module, comprising:
    a duplex fiber connector;
    a plurality of optical receivers disposed in optical communication with the duplex fiber connector;
    a plurality of optical transmitters disposed in optical communication with the duplex fiber connector; and an optical assembly according to claim 1 connecting the plurality of optical transmitters to the duplex fiber connector.

14. The optical assembly of claim 1, wherein the spacing is about 1.4 mm.

15. The optical assembly of claim 14, wherein the pitch is about 0.75 mm.

* * * * *